United States Patent
Chien et al.

(10) Patent No.: US 10,684,668 B2
(45) Date of Patent: Jun. 16, 2020

(54) USB INTERFACE SYSTEM CAPABLE OF AUTOMATICALLY ADJUSTING CONNECTION SPEED AND POWER CONSUMPTION CAPABILITIES AND METHOD THEREOF

(71) Applicant: REALTEK SEMICONDUCTOR CORP., Hsinchu (TW)

(72) Inventors: Yi-Ting Chien, Hsinchu County (TW); Sung-Kao Liu, Hsinchu (TW); Cheng-Yuan Hsiao, Taichung (TW); Wei-Hung Chuang, Taichung (TW); Chih-Yu Hsu, New Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/458,258

(22) Filed: Jul. 1, 2019

(65) Prior Publication Data

US 2020/0064900 A1 Feb. 27, 2020

(30) Foreign Application Priority Data

Aug. 22, 2018 (TW) .............................. 107129303 A (51) Int. Cl.
*G06F 1/3225* (2019.01)
*G06F 13/42* (2006.01)
(52) U.S. Cl.
CPC ............ *G06F 1/3225* (2013.01); *G06F 13/42* (2013.01)

(58) Field of Classification Search
CPC .............................. G06F 1/3225; G06F 13/42
See application file for complete search history.

(56) References Cited

U.S. PATENT DOCUMENTS

| | | | |
|---|---|---|---|
| 8,024,491 B1 * | 9/2011 | Wright | G06F 13/4295 710/16 |
| 8,135,883 B2 * | 3/2012 | Monks | G06F 13/387 710/38 |
| 10,372,634 B2 * | 8/2019 | Inoue | G06F 13/16 |
| 2010/0076616 A1 * | 3/2010 | Kagan | G06F 13/102 700/295 |
| 2011/0087806 A1 * | 4/2011 | Mohanty | G06F 13/385 710/16 |
| 2011/0179201 A1 * | 7/2011 | Monks | G06F 13/387 710/60 |

(Continued)

*Primary Examiner* — Tammara R Peyton
(74) *Attorney, Agent, or Firm* — Li & Cai Intellectual Property (USA) Office (57) ABSTRACT

A USB interface system capable of automatically adjusting connection speed and power consumption capability and a method thereof are provided. The method includes configuring a slave device to perform a first handshake procedure with a main device, and communicate with the main device by using a first connection specification; detecting a first power-off event by using a slave power detection module; when the first power-off event occurs, recording first power-off information by the memory unit. If the slave device is re-connected to the main device, the slave power detection module is configured to perform a second handshake process with the main device, and determine to re-communicate with the main device in a second connection specification different from the first connection specification according to the first power-off information.

20 Claims, 4 Drawing Sheets

(56) References Cited

U.S. PATENT DOCUMENTS

| | | | |
|---|---|---|---|
| 2011/0219272 A1* | 9/2011 | Lai | G06F 13/00 |
| | | | 714/54 |
| 2013/0227631 A1* | 8/2013 | Sharma | G06F 3/1431 |
| | | | 725/127 |
| 2016/0217093 A1* | 7/2016 | Whittington | H04L 12/40 |
| 2018/0024613 A1* | 1/2018 | Matsumoto | G06F 1/266 |
| | | | 713/310 |

* cited by examiner

USB INTERFACE SYSTEM CAPABLE OF AUTOMATICALLY ADJUSTING CONNECTION SPEED AND POWER CONSUMPTION CAPABILITIES AND METHOD THEREOF

CROSS-REFERENCE TO RELATED PATENT APPLICATION

This application claims the benefit of priority to Taiwan Patent Application No. 107129303, filed on Aug. 22, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a USB interface system capable of automatically adjusting connection speed and power consumption capability and a method thereof, and more particularly to a USB interface system capable of automatically adjusting connection speed and power consumption capability of a USB interface according to the recorded power-off information and a method thereof.

BACKGROUND OF THE DISCLOSURE

A typical USB device supports several USB connection speeds to achieve downward compatibility for the USB host platform, such as connection specifications that support Super speed plus (USB 3.1 Gen2), Super speed (USB 3.1 Gen1), and High Speed (USB 2.0). When a typical USB device is connected to the USB host platform, the USB device preferentially starts with the highest speed of USB connection speed to communicate with the USB host. The higher the USB connection speed is, the faster the data transfer is, and the greater the power consumption is required by the USB device.

Generally, the new USB host device (e.g., a notebook, a tablet, a mobile phone, and the like) can support a variety of USB connection speeds. When the USB device is connected, the final connection speed can be determined through the transmission protocol. When the USB host and the USB device both support the USB Super Speed Plus at the highest speed, the USB host and the USB device will communicate with each other at this speed and perform transmission.

However, many existing USB host platforms (e.g., tablets, mobile phones, and the like) have different power supply capabilities, and usually limit the power-carrying capability for the connected USB devices. Therefore, the currently connected USB device is not always allowed to be powered at high connection speed. When the USB device requires power greater than the power capability supported by the USB host platform, the USB device is likely to be powered-off. After the power is turned on again, the USB device will be powered off again since the connection speed is still at the highest speed, such that a dead loop is formed and the USB device can never be used by the USB host.

Therefore, it has become one of the important issues in this field to overcome the above-mentioned issues by improving the mechanism for power supply.

SUMMARY OF THE DISCLOSURE

In response to the above-referenced technical inadequacies, the present disclosure provides a USB interface system capable of automatically adjusting connection speed and power consumption capability of a USB interface according to the recorded power-off information and method thereof.

In one aspect, a method for automatically adjusting connection speed and power consumption capabilities of a USB interface is provided. The method is adapted to a slave device connecting to a USB port of a main device, and the method includes: configuring a slave power detection module of the slave device to perform a first handshake process and communicate with the main device in a first connection specification among a plurality of connection specifications; configuring the slave power detection module to detect a passive power-off event. When the passive power-off event occurs, a memory of the slave device is configured to record a first power-off information according to the passive power-off event. After the passive power-off event occurs, if the slave device is reconnected to the main device, the slave power detection module is configured to perform a second handshake process with the main device, and determine to re-communicate with the main device in a second connection specification among the plurality of connection specifications. The first connection specification and the second connection specification respectively have a first predetermined connection speed and a second predetermined connection speed different from each other.

In another aspect, a USB interface system capable of automatically adjusting connection speed and power consumption capabilities of a USB interface is provided. The USB interface system is adapted to a slave device, and includes a slave power detection module and a memory unit. The slave power detection module is configured to perform a first handshake process after the slave device is connected to the USB interface of a main device, and communicate with the main device in a first connection specification among a plurality of connection specifications. The slave power detection module is configured to detect a passive power-off event, and the memory is configured to record first power-off information according to the passive power-off event. After the passive power-off event occurs, if the slave device is reconnected to the main device, the slave power detection module is configured to perform a second handshake process with the main device, and determine to re-communicate with the main device in a second connection specification among the plurality of connection specifications. The first connection specification and the second connection specification respectively have a first predetermined connection speed and a second predetermined connection speed different from each other.

One of the beneficial effects of the present disclosure is that the USB interface system capable of automatically adjusting connection speed and power consumption capability and the method thereof provided by the present disclosure can satisfy the maximum power consumption limit of the USB host terminal and can meet the USB transfer speed capability under the power consumption limit. Even when the slave device is not provided with power deliver capabilities, in which the power supply capabilities of the USB main terminal are unknown, the USB slave terminal is able to automatically detect the connection speed and power consumption capabilities for the USB main terminal, so as to determine which one of the USB connection speeds should be utilized for communicating with the USB host terminal, thereby solving problems of compatibility associated with the USB host terminal.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
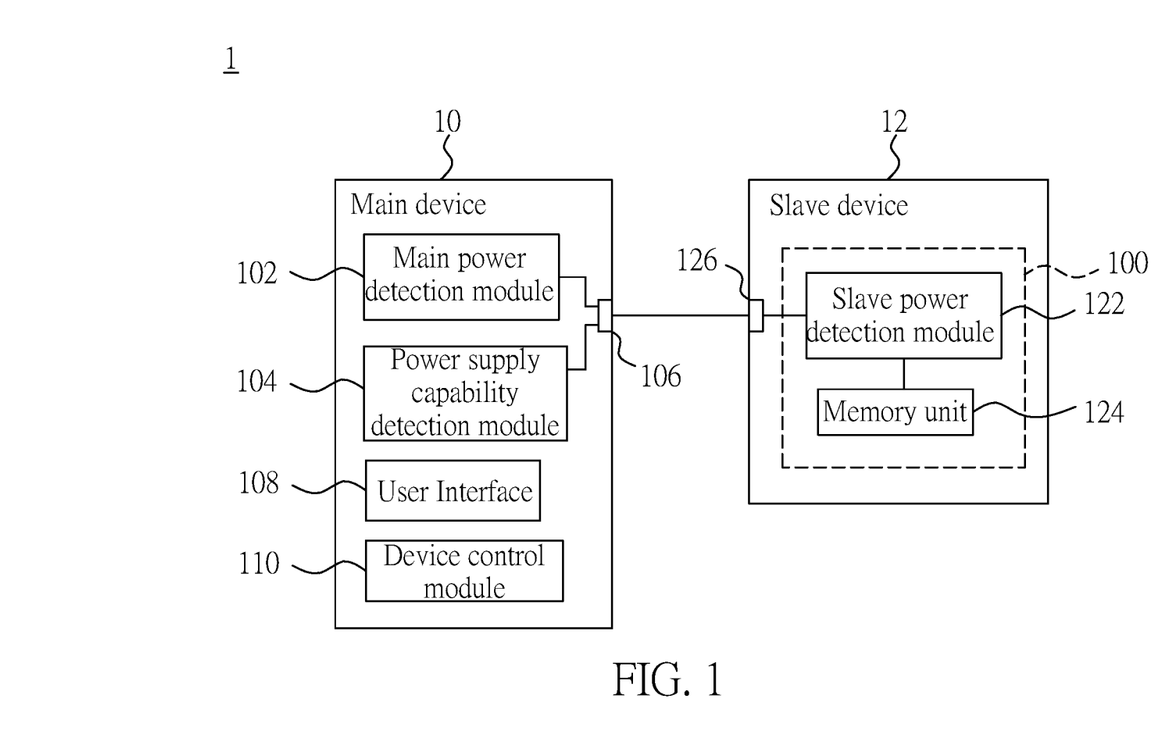
FIG. 1 is a block diagram showing a USB interface capable of automatically adjusting connection speed and power consumption capability according to an embodiment of the present disclosure.
Figure 2:
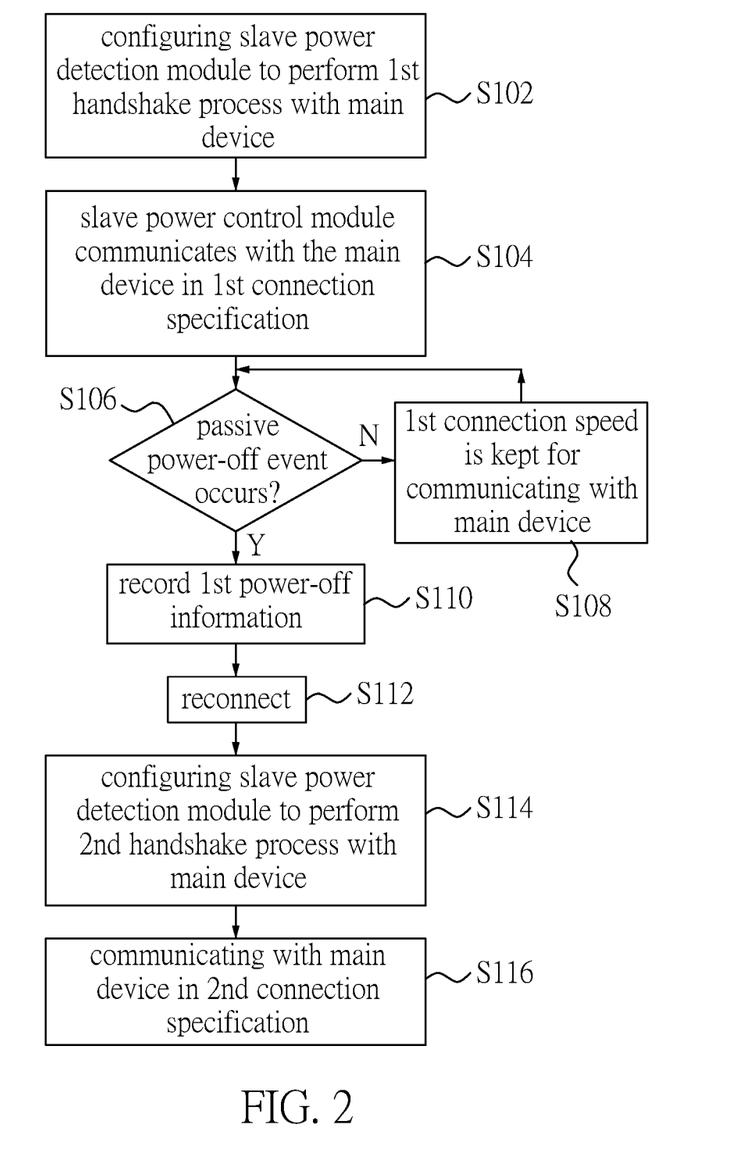
FIG. 2 is a flowchart showing a method of automatically adjusting connection speed and power consumption capability for a USB interface according to an embodiment of the present disclosure.

FIG. 1 is a block diagram showing a USB interface capable of automatically adjusting connection speed and power consumption capability according to an embodiment of the present disclosure, and FIG. 2 is a flowchart showing a method of automatically adjusting connection speed and power consumption capability for a USB interface according to an embodiment of the present disclosure. Referring to FIGS. 1 and 2, an embodiment of the present disclosure provides a USB interface 100 capable of automatically adjusting connection speed and power consumption capability, which is mainly adapted to a USB communication architecture including a main device 10 and a slave device 12. The main device 10 can be, for example, a notebook, a tablet, a mobile phone, and the like, and can include a main power control module 102, a power supply capability detecting module 104, and a first USB port 106.

The main power control module 102 can include a power supply, which is connected to mains electricity to provide power for operating the main device 10. The main power control module 102 enables the main device 10 to provide power to peripheral devices. The main power control module 102 may have a rectifier circuit, a buck-boost circuit, and a voltage stabilization circuit. The main power control module 102 can also include a USB interface driving chip for communication, data, and power transmission with an external USB interface-compatible device.

On the other hand, the slave device 12 can be a device without self-powered capability, such as a flash drive, and a portable solid state disk (SSD) device, and can be provided with a built-in USB interface 100 that automatically adjusts the connection speed and power consumption capability, including a slave power detection module 122 and a memory unit 124, and the USB interface 100 can be connected to a second USB port 126.

The first USB port 106 and the second USB port 126 are used to connect the main device 10 and the slave device 12, and may include a USB Type-A, a USB Type-B, and a USB Type-C interface.

The slave power detection module 122 can be configured to perform a first handshake process after the slave device 12 is connected to the USB port 106 of the main device 10, communicate with the main device 10 in a first connection specification among a plurality of connection specifications and to be charged by the main device 10. Here, the handshake process is mainly used to enable the main device 10 and the slave device 12 to perform data and power transmission according to mutually compatible connection specifications. In the embodiment of the present disclosure, the main device 10 and the slave device 12 are compatible with a plurality of connection specifications, which may include, for example, USB Supper Speed Plus (USB 3.1 Gen 2), USB Super Speed (USB 3.1 Gen 1), and USB. High Speed (USB 2.0), where USB Super Speed Plus has a bandwidth of about 10 GT/s, USB Super Speed has a bandwidth of about 5 GT/s, USB High Speed has a bandwidth of about 480 Mbps. The higher the transmission speed is, the higher the required clock frequency is, and the higher the power consumption is required by the slave device 12.

For the existing USB host device, even though the connection speed can support Super Speed Plus, the power supply capability thereof may not correspond to the maximum power specification of the maximum speed of the main device 10. In order to satisfy the maximum power consumption limit of the USB host terminal and meet the USB transmission speed capability under the power consumption limit, the present disclosure provides a novel mechanism for adjusting connection speeds and power consumption.

The power supply mechanism and the related module of the present disclosure are described in detail hereinafter according to FIG. 2. In the present embodiment, the method for automatically adjusting connection speed and power consumption capabilities of a USB interface can adapt to the system architecture mentioned above, but it is not limited thereto. The method provided by this embodiment can also be applied to any of the embodiments described above, in a manner or a variety of possibilities that can be envisioned by one of ordinary skill in the art. As shown in FIG. 2, the method for automatically adjusting connection speed and power consumption capabilities can include the following steps:

Step S102: configuring the slave power detection module 122 of the slave device 12 to perform a first handshake process with the main power control module 102 of the main device 10.

Step S104: After the first handshake process, the main power control module 102 and the slave power control module 122 determine that a first connection specification can be used for communicating to each other, and the slave power control module 122 communicates with the main device 10 in the first connection specification of the plurality of connection specifications. For example, starting with the highest speed, the first connection specification can be USB Super Speed Plus.

After the slave device 12 communicates with the main device 10, the power supply capability detection module 104 is configured to detect a current power required by the slave device 12. The power supply capability detection module 104 will determine whether the current power required by the slave device 12 is greater than a power supply capability of the main device 10. Here, the power supply capability can be set as a predetermined current value. If the current power required by the slave device 12 is greater than the predetermined current value, the main device 10 will configure the power control module 102 to shut down the power supply for the slave device 12, such that the slave device 12 is passively powered-off.

At the same time, step S106 is performed on the slave device 12, and the slave power detecting module 122 is configured to detect whether a passive power-off event occurs. If the passive power-off event does not occur, the method proceeds to step S108, and the first connection speed is kept for communicating with the main device 10. In other words, the slave device 12 can continue to operate at the highest speed for maximum performance. On the other hand, as described above, when it is determined that the current of the current power required by the slave device 12 is greater than the predetermined current value, the passive power-off event occurs, and the process proceeds to step S110.

Step S110: configuring the memory unit 124 of the slave device 12 to record first power-off information according to the passive power-off event. In detail, the memory unit 124 can be non-volatile memory, and the stored data will not disappear even if the slave device 12 is powered-off Step S112: reconnecting the slave device 12 to the main device 10.

Step S114: configuring the slave power detection module 122 to perform a second handshake process with the main device 10.

Step S116: configuring the slave power detection module 122 to determine to communicate with the main device 10 in a second connection specification of the plurality of connection specifications. In this case, the first connection specification and the second connection specification respectively have a first predetermined connection speed and a second predetermined connection speed different from each other. When the slave device 12 is powered-off, the memory unit 124 records power-off information including the first connection specification and the first predetermined connection speed, for example, USB Super Speed Plus and 10 GT/s for the present embodiment. When the slave device 12 is reconnected, the slave device 12 adjusts, according to the power-off information, the connection speed capability to be downward, that is, the second connection specification, such as USB Super speed having a second predetermined connection speed of about 5 GT/s. By adjusting the connection speed capability downward, the power consumption of the slave device will be lower than the previous connection speed.

Figure 3:
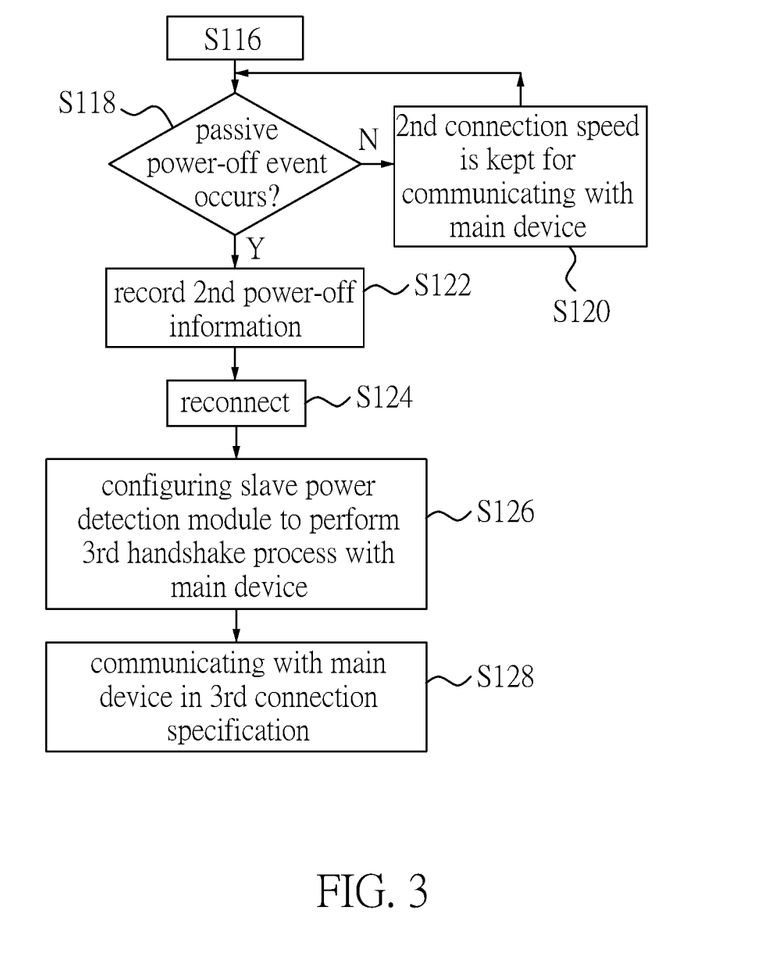
FIG. 3 is another flowchart showing a method of automatically adjusting connection speed and power consumption capability for a USB interface according to an embodiment of the present disclosure.

Another power supply mechanism of the present disclosure is provided hereinafter according to FIG. 3. The method continuous from step S116 in the embodiment mentioned above, when the slave device 12 communicates with the main device 10 in the second connection specification, the method proceeds to step S118, and the slave power detection module 122 is configured to detect whether another power-off event occurs. If the another power-off event does not occur, the method proceeds to step S120, where the second connection speed is kept for communicating with the main device. Then, the method returns to step S118, where the slave power detection module 122 keeps detecting whether another power-off event occurs. In other words, the maximum power consumption limit of the USB host terminal can be satisfied, and the USB transmission speed capability can be meet under this power consumption limit, thereby operating in a secondary-high speed while being connected, On the other hand, when the main device 10 determines that the current of the current power required by the slave device 12 is greater than the predetermined current value, the power supply is interrupted, another passive power-off event occurs, and the method proceeds to step S122.

Step S122: configuring the memory unit 124 of the slave device 12 to record second power-off information according to the passive power-off event and the first power-off information.

Step S124: reconnecting the slave device 12 to the main device 10.

Step S126: configuring the slave power detection module 122 to perform a third handshake process with the main device 10.

Step S128: determining, according to the second power-off information, to communicate with the main device 10 in a third connection specification of the plurality of connection specifications. In this case, the third connection specification may have a third predetermined connection speed, which may be lower than the first predetermined connection speed and the second predetermined connection speed. When the power is off, the memory unit 124 records the power-off information including the second connection specification and the second predetermined connection speed, for example, USB Super Speed and 5 GT/s in this embodiment, respectively. When the slave device 12 is reconnected, the slave device 12 adjusts, according to the power-off information, the connection speed capability to be downward, that is, the third connection specification, such as USB High speed having a third predetermined connection speed of about 480 Mbps.

Figure 4:
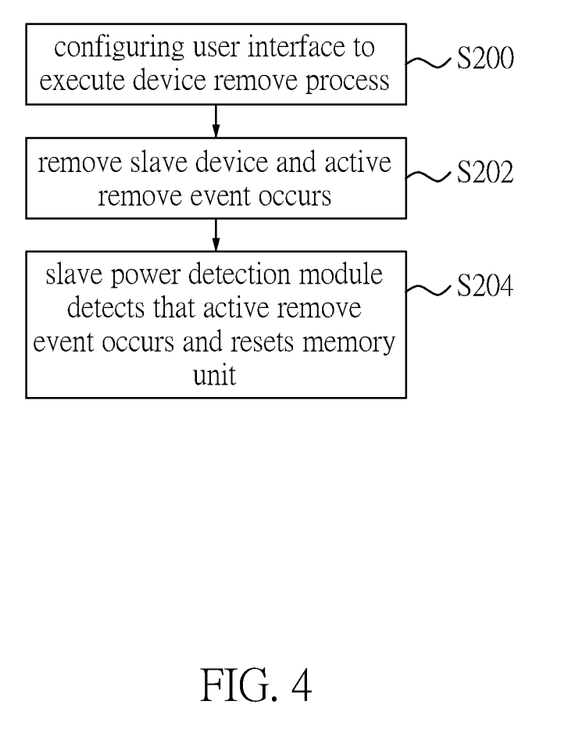
FIG. 4 is a flowchart showing a method of automatically adjusting connection speed and power consumption capability for a USB interface according to an embodiment of the present disclosure.

As shown in FIG. 1, the main device 10 further includes a user interface 108, which is configured to provide a user to execute a device remove process. Reference is now made to FIG. 4, which is a flowchart showing a method of automatically adjusting connection speed and power consumption capability for a USB interface according to another embodiment of the present disclosure. The method Includes:

Step S200: configuring the user interface 108 of the main device 10 to execute the device remove process. Here, the device remove process can include a typical remove process performed by the device control module 110 of the main device 10.

Step S202: configuring the device control module 110 to remove the slave device 12, such that the slave device 12 experiences an active remove event.

Step S204: When the slave power detection module 122 detects that the active remove event occurs, the slave power detection module 122 resets the memory unit 124 accordingly. Therefore, when the slave device 12 is reconnected to the main device 10, since the power-off information is removed from the memory unit 124, the slave device 10 is configured to perform the procedures mentioned above and starts with the highest speed, i.e., the first connection specification.

Based on the above, the USB interface system capable of automatically adjusting connection speed and power consumption capability and method thereof provided by the present disclosure can satisfy the maximum power consumption limit of the USB host terminal and meet the USB transfer speed capability under the power consumption limit. Even though the slave device is provided without power deliver capabilities, in which the power supply capabilities of the USB main terminal remains unknown, the USB slave terminal is still able to automatically detect the connection speed and power consumption capabilities for the USB main terminal, so as to determine which one of the USB connection speeds should be utilized for communicating with the USB host terminal, thereby solving problems of compatibility associated with the USB host terminal.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for automatically adjusting connection speed and power consumption capabilities of a USB interface, adapted to a slave device connecting to a USB port of a main device, the method comprising:
    configuring a slave power detection module of the slave device to perform a first handshake process and communicate with the main device in a first connection specification among a plurality of connection specifications; and
    configuring the slave power detection module to detect a passive power-off event,
    wherein when the passive power-off event occurs, a memory unit of the slave device is configured to record a first power-off information according to the passive power-off event,
    wherein after the passive power-off event occurs, if the slave device is re-connected to the main device, the slave power detection module is configured to perform a second handshake process with the main device, and determine to re-communicate with the main device in a second connection specification among the plurality of connection specifications, and
    wherein the first connection specification and the second connection specification respectively have a first predetermined connection speed and a second predetermined connection speed different from each other.

2. The method for automatically adjusting connection speed and power consumption capabilities of the USB interface according to claim 1, wherein the first predetermined connection speed is faster than the second predetermined connection speed.

3. The method for automatically adjusting connection speed and power consumption capabilities of the USB interface according to claim 1, wherein the first power-off information is recorded with the first connection specification and the first predetermined connection speed.

4. The method for automatically adjusting connection speed and power consumption capabilities of the USB interface according to claim 1, wherein in the second handshake process, the slave power detection module determines to communicate with the main device in the second connection specification according to the first power-off information.

5. The method for automatically adjusting connection speed and power consumption capabilities of the USB interface according to claim 1, further including:
    configuring the slave power detection module to detect another passive power-off event;
    when the another passive power-off event occurs, configuring the memory unit to record a second power-off information according to the first power-off information and the another passive power-off event; and
    wherein after the another passive power-off event occurs, if the slave device is re-connected to the main device, the slave power detection module is configured to perform a third handshake process with the main device, and determines to re-communicate with the main device in a third connection specification according to the second power-off information, wherein the third connection specification has a third predetermined connection speed different from the first predetermined connection speed and the second predetermined connection speed.

6. The method for automatically adjusting connection speed and power consumption capabilities of the USB interface according to claim 5, wherein the second power-off information is recorded with the second connection specification and the second predetermined connection speed.

7. The method for automatically adjusting connection speed and power consumption capabilities of the USB interface according to claim 5, wherein the third predetermined connection speed is slower than the first predetermined connection speed and the second predetermined connection speed.

8. The method for automatically adjusting connection speed and power consumption capabilities of the USB interface according to claim 5, wherein in the third handshake process, the slave power determines, according to the second power-off information, to communicate with the main device in the third connection specification.

9. The method for automatically adjusting connection speed and power consumption capabilities of the USB interface according to claim 1, further comprising:
configuring the slave power detection to detect an active power-off event, wherein the active power-off event is generated by using a user interface of the main device to execute a device remove process; and
configuring the slave power detection module to reset the memory unit according to the active power-off event.

10. The method for automatically adjusting connection speed and power consumption capabilities of the USB interface according to claim 1, wherein the plurality of connection specifications include USB Supper Speed Plus (USB 3.1 Gen 2), USB Super Speed (USB 3.1 Gen 1), and USB High Speed (USB 2.0).

11. A USB interface system capable of automatically adjusting connection speed and power consumption capabilities of a USB interface, adapted to a slave device, the USB interface system comprising:
a slave power detection module, configured to perform a first handshake process after the slave device is connected to the USB interface of a main device, and communicate with the main device in a first connection specification among a plurality of connection specifications; and
a memory unit,
wherein the slave power detection module is configured to detect a passive power-off event,
wherein the memory is configured to record a first power-off information according to the passive power-off event, and after the passive power-off event occurs, if the slave device is re-connected to the main device, the slave power detection module is configured to perform a second handshake process with the main device, and determine to re-communicate with the main device in a second connection specification among the plurality of connection specifications, and
wherein the first connection specification and the second connection specification respectively have a first predetermined connection speed and a second predetermined connection speed different from each other.

12. The USB interface system capable of automatically adjusting connection speed and power consumption capabilities of the USB interface according to claim 11, wherein the first predetermined connection speed is faster than the second predetermined connection speed.

13. The USB interface system capable of automatically adjusting connection speed and power consumption capabilities of the USB interface according to claim 11, wherein the first power-off information is recorded with the first connection specification and the first predetermined connection speed.

14. The USB interface system capable of automatically adjusting connection speed and power consumption capabilities of the USB interface according to claim 11, wherein in the second handshake process, the slave power detection module determines to communicate with the main device in the second connection specification according to the first power-off information.

15. The USB interface system capable of automatically adjusting connection speed and power consumption capabilities of the USB interface according to claim 11, wherein the slave power detection module is configured to detect another power-off event,
wherein when the another passive power-off event occurs, the memory unit is configured to record a second power-off information according to the first power-off information and the another passive power-off event; and
wherein after the passive power-off event occurs, if the slave device is re-connected to the main device, the slave power detection module is configured to perform a second handshake process with the main device, and determine to communicate with the main device in a second connection specification among the plurality of connection specifications, and
wherein the third connection specification has a third predetermined connection speed different from the first predetermined connection speed and the second predetermined connection speed.

16. The USB interface system capable of automatically adjusting connection speed and power consumption capabilities of the USB interface according to claim 15, wherein the second power-off information is recorded with the second connection specification and the second predetermined connection speed.

17. The USB interface system capable of automatically adjusting connection speed and power consumption capabilities of the USB interface according to claim 15, wherein the third predetermined connection speed is slower than the first predetermined connection speed and the second predetermined connection speed.

18. The USB interface system capable of automatically adjusting connection speed and power consumption capabilities of the USB interface according to claim 15, wherein in the third handshake process, the slave power determines, according to the second power-off information to communicate with the main device in the third connection specification.

19. The USB interface system capable of automatically adjusting connection speed and power consumption capabilities of the USB interface according to claim 11, wherein the slave power detection module is configured to detect an active remove event, and the active power-off event is generated by using a user interface of the main device to execute a device remove process; and
wherein the slave power detection module is configured to reset the memory unit according to the active power-off event.

20. The USB interface system capable of automatically adjusting connection speed and power consumption capabilities of the USB interface according to claim 11, wherein the plurality of connection specifications include USB Supper Speed Plus (USB 3.1 Gen 2), USB Super Speed (USB 3.1 Gen 1), and USB High Speed (USB 2.0).

* * * * *